Figures 1, 2, 3, 4:
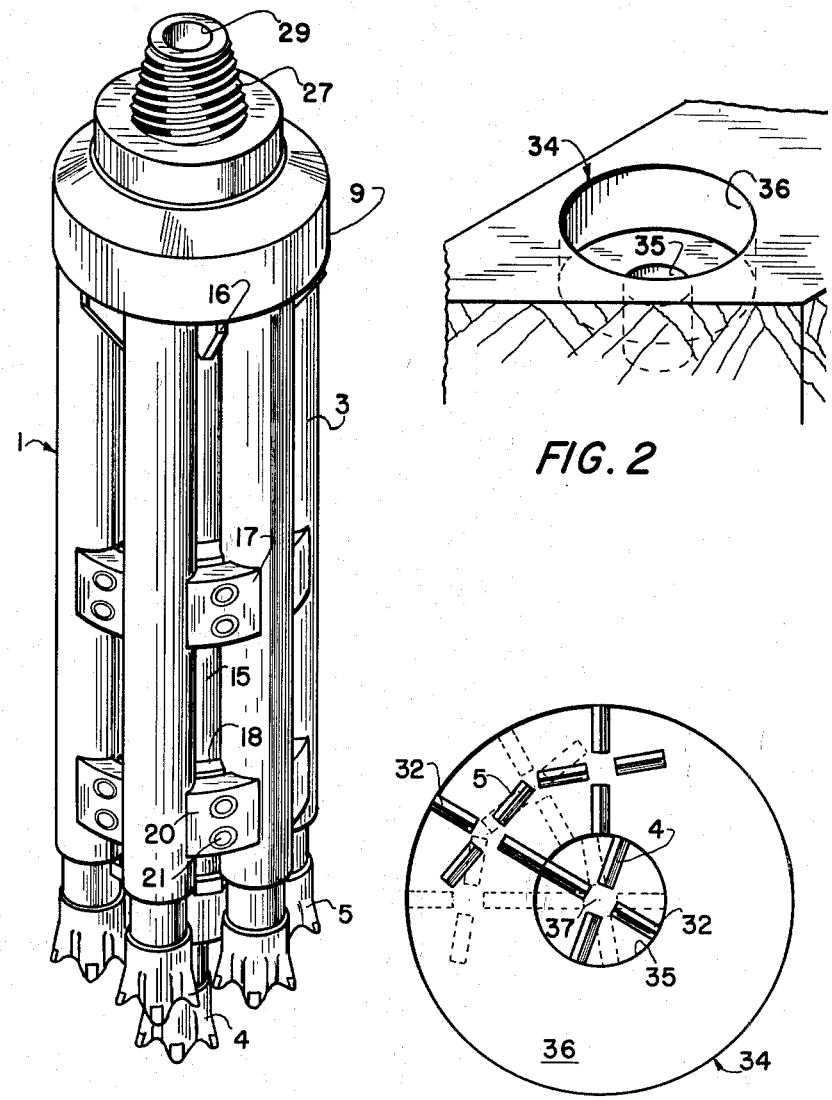

Aug. 11, 1964  E. H. KURT ETAL  3,144,086
GANG DRILL

Filed April 9, 1962  2 Sheets-Sheet 1

INVENTORS
EWALD H. KURT
JOHN W. ADAMS
BY
David W. Tibbetts
THEIR ATTORNEY

Aug. 11, 1964   E. H. KURT ETAL   3,144,086
GANG DRILL

Filed April 9, 1962   2 Sheets-Sheet 2

INVENTORS
EWALD H. KURT
JOHN W. ADAMS
BY
David W. Tibbott
THEIR ATTORNEY

United States Patent Office 3,144,086
Patented Aug. 11, 1964

3,144,086
GANG DRILL
Ewald H. Kurt and John W. Adams, Phillipsburg, N.J., assignors to Ingersoll-Rand Company, New York, N.Y., a corporation of New Jersey
Filed Apr. 9, 1962, Ser. No. 186,248
7 Claims. (Cl. 175—96)

This invention relates to "down-the-hole" percussive rock drills.

A drill having a percussive or hammer mechanism which travels down a hole with its drill bit is termed, in the trade, a "down-the-hole" drill. An example of a conventional down-the-hole drill is disclosed in the U.S. Patent No. 2,951,467 of W. A. Morrison.

Heretofore, it has not been economically practical to use conventional down-the-hole drills for drilling holes much larger than 9″ in diameter. Among the reasons for this limitation in hole size is that rock drilling bits of larger diameter are too expensive to be feasible. Also, in order for such larger bits to be effective, they must be struck with blows of such greater force that it is impractical to build a drill which can withstand such impact forces.

The principal object of this invention is to provide a down-the-hole drill for drilling larger holes which is economically practical to manufacture and use.

Other important objects of this invention are: to provide a down-the-hole drill for drilling large diameter holes which uses relatively inexpensive small diameter drill bits; to provide a down-the-hole drill for drilling large diameter holes which eliminates the need for a single large diameter drill bit; to provide a down-the-hole drill for drilling large diameter holes which utilizes relatively small impact forces of a magnitude used in conventional down-the-hole drills for drilling small diameter holes; and to provide a down-the-hole drill for drilling large diameter holes which can be repaired relatively inexpensively.

In general, the objects of this invention are attained by assembling a plurality of conventional down-the-hole drills together in a unit or cluster which can be fed down a hole on the end of a drill rod and simultaneously rotated as a unit while the individual drills are successively impacting their drill bits independently of each other. Such an assembly is termed a gang drill. One highly desirable feature of this gang drill is that it uses relatively inexpensive small diameter drill bits which can be individually replaced as they wear out. In a preferred embodiment of the invention, all the drills are attached to a common head which is carried on the end of a drill rod and one of the drills is located along the central axis of the common head and the drill rod to project ahead of the other drills for serving as a pilot drill during the drilling operation.

Figures 5, 6:
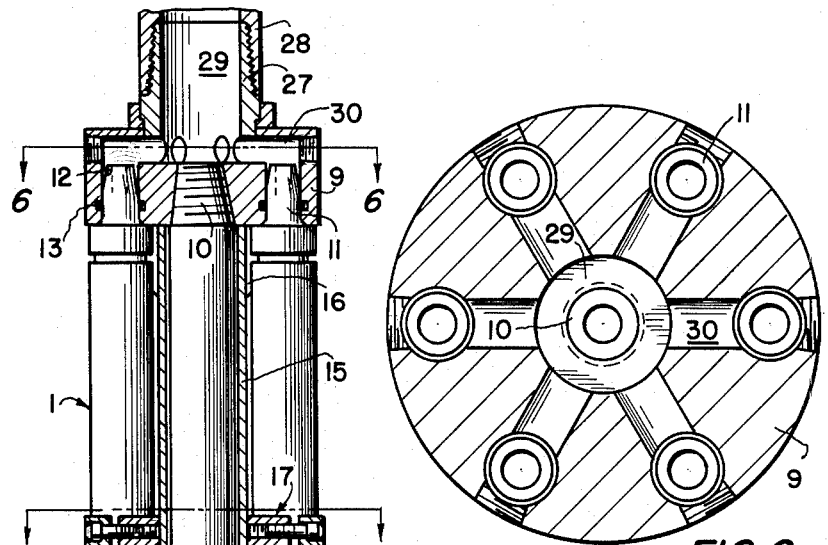
Figure 8:
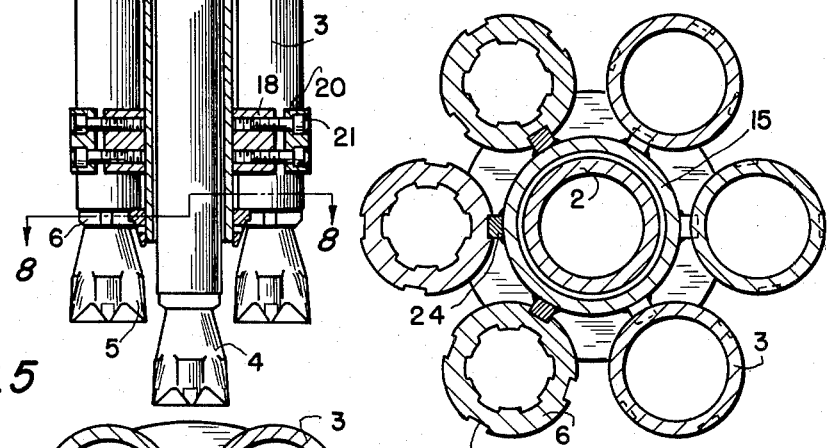
Figure 7:
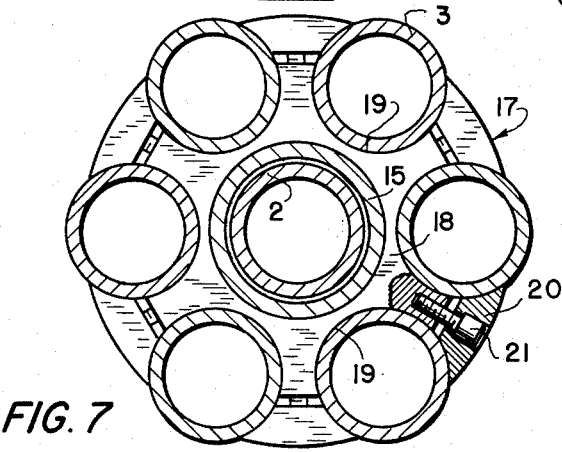

The invention is described in connection with the drawings wherein:

FIG. 1 is a perspective view of the novel gang drill;
FIG. 2 is a diagrammatic perspective view of the shape of the bottom of the hole which is drilled by the gang drill of FIG. 1;
FIG. 3 is an enlarged plan view of the hole in FIG. 2 illustrating how the drill bits are rotated between successive impacts;
FIG. 4 is an enlarged front end view of the gang drill of FIG. 1 showing the relative arrangement of the drill bits;
FIG. 5 is a longitudinal section of the gang drill;
FIG. 6 is an enlarged section taken on the line 6—6 in FIG. 5;
FIG. 7 is an enlarged section taken on the line 7—7 in FIG. 5; and
FIG. 8 is an enlarged section taken on the lines 8—8 in FIG. 5.

The gang drill shown in the drawings comprises a body 1 composed of a plurality of conventional down-the-hole rock drills. These drills include a center drill 2 and six surrounding or outer drills 3 which are circumferentially spaced around the center drill 2 at equal circumferential distances from each other and at equal radial distances from the center drill 2. These drills 2 and 3 carry conventional rock drilling bits on their front ends with the center drill bit being designated 4 and the outer drill bits designated 5.

The interior percussive or impacting mechanism of each of the drills 2 and 3 is conventional and, therefore, no attempt is made to show or describe it in this application. A conventional rock drill is disclosed in the U.S. Patent No. 2,951,467 of W. A. Morrison. This patent should be referred to by those who are unfamiliar with this art.

The rear ends or backheads of the drills 2 and 3 are attached to the front face of a common head 9. The center drill 2 has its backhead 10 threaded centrally into the front face of the common head 9 while the outer drills 3 have their backheads 11 snugly seated in sockets 12 in the common head 9. The sockets 12 contain O-rings 13 encircling the drill backheads 11 for sealing the clearance between the socket walls and the backheads 11.

The backhead 10 of the center drill 2 is arranged so that the center drill bit 4 projects forward of the outer drill bits 5 so that the center drill 2 acts as a pilot drill during a drilling operation, thus aiding in keeping the hole straight. This location of the center drill 2 is provided by making the center drill backhead 10 longer than the outer drill backheads 11.

The center drill 2 extends loosely through an elongate tube 15 with a small clearance between the center drill 2 and the tube interior, as shown in FIG. 5. The rear end of the tube 15 is welded or otherwise fixed to the front face of the common head 9 with triangularly shaped gusset plates 16 aiding in holding the tube 15 rigidly in place on the common head 9.

The outer drills 3 are clamped in place on the tube 15 by a pair of clamps 17, one being located about midway of the length of the tube 15 and another located near its front end. Each of the clamps 17 is identical and includes an inner ring 18 circling the tube 15 and being welded thereto. The outer circumference of the ring 18 is provided with a series of angularly spaced concave notches 19 adapted to receive and partially encircle the various outer drills 3. Around the outside of the outer drills 3 are placed wedge-shaped blocks 20 which seat on adjacent drills 3 and are fixed to the periphery of the ring 18 by bolts 21, as seen in FIG. 7. The tightening of the bolts 21 press the wedge blocks 20 inwardly and lock the outer drills 3 securely in the notches 19 in the ring 18.

The outer drills 3 are angularly fixed in selected positions on the tube 15 by means of keys 24 attached to the outer periphery of the front end of the tube 15 and engaging grooves 25 provided in the drill chucks 6. These keys 24 insure that the outer drill bits 5 remain properly indexed, which will be clearly explained later.

The rear face of the common head 9 includes a threaded nipple 27 adapted to be attached in the end of a hollow drill rod 28. A central passage 29 extends forward through the nipple 27 and the common head 9 to the fluid inlet of the center drill 2 and a series of radial branch passages 30 run through the common head 9 from the central passage 29 to the inlets of the various outer drills 3. Hence, operating fluid for the drills flows through the hollow drill rod 28 and the central passage 29 to the center drill 2, and through the branch passages 30 to the outer drills 3.

FIG. 4 shows the desired indexing arrangement of the outer drill bits 5. Each of the cutting edges of these drill bits is designated 32. In order for the gang drill to drill a maximum sized hole, the outermost cutting edges 32 of the outer drill bits 5 should extend substantially radially with respect to the center drill bit 4. The keys 24 on the front of the tube 15 insure that the selected index of the outer drill bits 5 is maintained.

During a drilling operation, the outermost cutting edges 32 of the outer drill bits 5 will wear faster than the inner cutting edges. This arrangement allows the outer drills 3 to be re-indexed occasionally to swing one of the other cutting edges 32 into the position of the outermost cutting edge to lengthen the useful lives of the outer drill bits 5.

Operation

During operation, the gang drill is fed operating pressure fluid through the hollow drill rod 28 from a conventional source (not shown) and the drill rod 28 is simultaneously rotated and fed axially forward. All of this is carried out by conventional means normally used for a single down-the-hole drill.

The bottom shape of the hole 34 drilled by the gang drill is shown in FIG. 2. The center drill bit 4 leads the outer drill bits 5 and cuts a small central hole 35. The lagging outer drill bits 5 simultaneously cut an enlarged diameter annular space 36 which combines with the small center hole 35 to form the entire hole 34.

FIG. 3 shows the cutting action of the drill bits 4 and 5. The center drill bit 4 merely rotates about its own axis 37 while the outer drill bits 5 swing at equal angular speed about the center drill axis 37. The outer drill bits 5 cut the annular space 36 because they are offset from the center axis 37. FIG. 3 illustrates the positions of the cutting edges 32 of the drill bits 4 and 5 during successive impacts, with the cutting edges being shown in solid lines at one impact and in dotted lines on the next impact. The impacts of the individual drills usually do not occur simultaneously since they are independently operated.

It will be understood that although only one embodiment of the invention is specifically described, the invention may embrace various other embodiments which are obvious from an understanding of the described embodiment and are embraced within the claims of the invention.

Having described our invention, we claim:

1. A gang drill comprising: a body composed of a cluster of conventional down-the-hole fluid-powered percussive drills located in parallel relationship, each of said drills including a separate casing having a slidably mounted drill bit at the front end of said body for independent reciprocating movement relative to the bits of the other drills and a fluid-operated percussive impact mechanism in said casing adapted to strike successive axial impacts to the drill bit; said drills being arranged so that their bits cooperate with each other to drill a large hollow cylindrical hole during the operation of the gang drill; a head located at the rear end of said body and containing a central fluid supply passage and a plurality of branch passages for feeding fluid pressure from said central supply passage to each of said down-the-hole drills; said separate drill casings being substantially rigidly attached at their rear ends to said head; connection means on said head for attaching said head to a hollow drill rod which supports the gang drill, conveys fluid pressure to said central supply fluid passage and rotates said gang drill about a rotation axis; an elongate support member separate from said conventional drills and located within said cluster of conventional drills, said elongate support member being fixed to said head and projecting forward of said head with its axis extending along substantially the central axis of the gang drill; and means spaced forward of said head for rigidly attaching said down-the-hole drill casings to the periphery of said elongate member to hold them together in fixed angular relationship to each other.

2. The gang drill of claim 1 including: a down-the-hole drill located on the central axis of said head and said drill rod; and with the remaining down-the-hole drills being located around the center drill.

3. The gang drill of claim 2 wherein: said elongate support member is a tube which is fixed to said head; said center drill is located in said tube; and the remaining drills are attached to the outer periphery of said tube.

4. The gang drill of claim 3 wherein: said center drill projects ahead of the remaining drills so as to serve as a pilot drill.

5. The gang drill of claim 4 wherein: the drills surrounding the center drill are keyed to said tube to prevent them from rotating.

6. The gang drill of claim 5 wherein: said drill bits have multiple cutting edges on their front faces; and the drill bits other than said center drill bit are arranged so that at least one edge extends substantially radially to the center axis of said center drill bit.

7. A gang drill comprising: a plurality of independently operative down-the-hole percussive drills, each having a body portion and a projecting multi-edged bit; a head connected to and supporting all of said drills and having air supply passages leading to said drills; one of said drills being mounted centrally on said head; the remainder of said drills being arranged parallel to and encircling the central drill; a tube attached to said head and extending forwardly about said central drill; a block on said tube fitting said encircling drills; and additional blocks attachable to the first said block between said encircling drills to clamp said encircling drills in place on said tube.

References Cited in the file of this patent

UNITED STATES PATENTS

| 836,494 | Frieh et al. | Nov. 20, 1906 |
| 899,729 | Hardsocg | Sept. 29, 1908 |
| 1,612,338 | Wilson et al. | Dec. 28, 1926 |
| 1,891,416 | Harris | Dec. 20, 1932 |
| 2,016,068 | Bannister | Oct. 1, 1935 |
| 2,595,126 | Causey | Apr. 29, 1952 |
| 2,942,850 | Heath | June 28, 1960 |
| 2,951,467 | Morrison | Sept. 6, 1960 |